(12) United States Patent
Lanford et al.

(10) Patent No.: US 11,900,089 B2
(45) Date of Patent: Feb. 13, 2024

(54) AUTOMATICALLY CONFIGURING AND DEPLOYING A SOFTWARE OPERATOR IN A DISTRIBUTED COMPUTING ENVIRONMENT FROM A PACKAGE

(71) Applicant: RED HAT, INC., Raleigh, NC (US)

(72) Inventors: Joseph Wallace Lanford, Annandale, VA (US); Eric Stroczynski, San Francisco, CA (US); Jesus Miguel Rodriguez, Rolesville, NC (US)

(73) Assignee: RED HAT, INC., Raleigh, NC (US)

( * ) Notice: Subject to any disclaimer, the term of this patent is extended or adjusted under 35 U.S.C. 154(b) by 44 days.

(21) Appl. No.: 17/307,071

(22) Filed: May 4, 2021

(65) Prior Publication Data

US 2022/0357938 A1 Nov. 10, 2022

(51) Int. Cl.
*G06F 8/61* (2018.01)
*G06F 9/54* (2006.01)
*G06F 9/455* (2018.01)

(52) U.S. Cl.
CPC ............ *G06F 8/63* (2013.01); *G06F 9/45558* (2013.01); *G06F 9/547* (2013.01); *G06F 2009/45562* (2013.01)

(58) Field of Classification Search
CPC ........ G06F 8/63; G06F 9/45558; G06F 9/547; G06F 2009/45562
See application file for complete search history.

(56) References Cited

U.S. PATENT DOCUMENTS 10,778,540 B2   9/2020  Fitzer et al.
11,593,143 B2*  2/2023  Banerjee ............. G06F 9/45558
(Continued)

FOREIGN PATENT DOCUMENTS

CN   107079263 B  * 12/2018  ......... G06F 21/6209
CN   109844748 A  *  6/2019  ............. G06F 21/53
(Continued)

OTHER PUBLICATIONS

Hoebeke et al., "A Cloud-based Virtual Network Operator for Managing Multimodal LPWA Networks and Devices", Jan. 2019, IEEE (Year: 2019).*
(Continued)

*Primary Examiner* — Wei Y Zhen
*Assistant Examiner* — Junchun Wu
(74) *Attorney, Agent, or Firm* — Kilpatrick Townsend & Stockton LLP (57) ABSTRACT

A software operator can be automatically configured and deployed in a distributed computing environment from a package. For example, a system can receive a command specifying a package for deploying a target operator. In response to receiving the command, the system can automatically configure and deploy the target operator in a computing cluster. This may involve the system extracting a name for the target operator from the corresponding package and assigning an operator group to the target operator. The system can then subscribe the target operator to an operator management system by indicating the name and a namespace of the operator group to one or more application programming interfaces of the computing cluster. The system can also deploy an instance of the target operator in the namespace on the computing cluster.

18 Claims, 6 Drawing Sheets

(56) References Cited

U.S. PATENT DOCUMENTS

| | | | |
|---|---|---|---|
| 11,675,578 B2 * | 6/2023 | Antinori | G06F 8/63 717/174 |
| 2011/0004676 A1 * | 1/2011 | Kawato | G06F 9/5044 718/1 |
| 2015/0007332 A1 * | 1/2015 | Satish | G06F 8/60 726/25 |
| 2019/0205110 A1 * | 7/2019 | Liu | G06F 8/48 |
| 2019/0266691 A1 * | 8/2019 | Hirose | B60L 53/305 |
| 2021/0051118 A1 * | 2/2021 | Wang | G06F 12/0284 |
| 2021/0397729 A1 * | 12/2021 | McQuaid | G06F 21/6218 |
| 2022/0012045 A1 * | 1/2022 | Rudraraju | G06F 8/36 |
| 2022/0066764 A1 * | 3/2022 | Rosenzwig | G06F 8/63 |
| 2022/0107848 A1 * | 4/2022 | Wang | H04L 67/1004 |
| 2022/0114003 A1 * | 4/2022 | Okman | G06F 9/45558 |
| 2022/0147337 A1 * | 5/2022 | Michelsohn | G06F 11/1433 |
| 2022/0158926 A1 * | 5/2022 | Wennerström | H04W 24/06 |
| 2022/0159056 A1 * | 5/2022 | Rose | H04L 63/10 |

FOREIGN PATENT DOCUMENTS

| | | | | |
|---|---|---|---|---|
| CN | 110597600 A | * | 12/2019 | G06F 9/45558 |
| CN | 111464454 A | * | 7/2020 | G06F 9/45558 |
| CN | 111736949 A | | 10/2020 | |
| CN | 111930759 A | * | 11/2020 | G06F 16/2358 |
| CN | 112214330 A | * | 1/2021 | |
| CN | 111818188 B | | 2/2021 | |
| CN | 112558987 A | * | 3/2021 | |
| CN | 112581201 A | * | 3/2021 | |
| CN | 112698914 A | * | 4/2021 | G06F 9/45558 |
| CN | 111464454 B | * | 3/2022 | G06F 9/45558 |
| JP | 2006086572 A | * | 3/2006 | G07D 5/08 |
| JP | 7092848 B2 | * | 6/2022 | G07D 5/08 |
| TW | I759096 B | * | 2/2021 | |
| TW | I759096 B | * | 3/2022 | |

OTHER PUBLICATIONS

Arcangeli et al., "Automatic Deployment of Distributed Software Systems: Definitions and State of the Art", Aug. 2020, HAL open science (Year: 2020).*

Iombardi et al., "Elastic Symbiotic Scaling of Operators and Resources in Stream Processing Systems", Mar. 2018, IEEE, vol. 29, No. 3 (Year: 2018).*

Ulbrich et al., "Programming Abstractions for Content-Based Publish/Subscribe in Object-Oriented Languages", 2004, Springer-Verlag Berlin Heidelberg (Year: 2004).*

McCormick, J., "Deploying Operators with OLM bundles," Red Hat, Inc., Dec. 21, 2020, https://www.redhat.com/en/blog/deploying-operators-olm-bundles.

Tenzer, K., "OpenShift Operator Lifecycle Management Guide: Integrating Operators in OLM Part IV," Apr. 23, 2020, https://keithtenzer.com/2020/04/23/openshift-operator-lifecycle-management-guide-integrating-operators-in-olm-part-iv/.

"Working with Bundle Images," Red Hat, Inc., downloaded from Internet 2021, https://docs.okd.io/latest/operators/operator_sdk/osdk-working-bundle-images.html.

"Operator Bundle," GitHub, Inc., 2021, https://github.com/openshift/enhancements/blob/master/enhancements/olm/operator-bundle.md.

"Deploy with OLM from Source," The Apache Software Foundation, 2021, https://camel.apache.org/camel-k/latest/contributing/local-deployment-olm.html.

* cited by examiner

```
kind: CatalogSource
metadata:
  name: doo-operator
  namespace: operatorsNamespace
spec:
  sourceType: gRPC
  image: quay.io/username/doo-operator-index:v0.0.1
```

AUTOMATICALLY CONFIGURING AND DEPLOYING A SOFTWARE OPERATOR IN A DISTRIBUTED COMPUTING ENVIRONMENT FROM A PACKAGE

TECHNICAL FIELD

The present disclosure relates generally to configuring and deploying a software operator. More specifically, but not by way of limitation, this disclosure relates to automatically configuring and deploying a software operator in a distributed computing environment from a package.

BACKGROUND

Distributed computing environments such as cloud computing environments and data grids have recently grown in popularity. In some cases, a distributed computing environment includes a container orchestration platform to automate the deployment, scaling, and management of software components (e.g., applications and microservices) inside containers. A container is a relatively isolated virtual environment that is generated by leveraging the resource isolation features of the Linux kernel such as cgroups and namespaces. One or more containers can be incorporated into a container pod (or "pod"), which is a higher-level abstraction of a grouping of containerized components that share resources and may be co-located on the same host machine. Container orchestration platforms can help manage containers and pods to reduce the workload on users.

One popular container orchestration platform is Kubernetes. Distributed computing environments running Kubernetes can be referred to as Kubernetes environments. Kubernetes environments can include software operators ("operators") for automating various repeatable tasks, such as deployment, scaling, and backup of software components. In the context of Kubernetes, an operator is a software extension that can manage an assigned software component, such as a data object or a stateful application. Once deployed, operators can create, configure, and manage instances of their assigned software components on behalf of a user in a declarative way. For example, an operator can monitor the state of an assigned software component and perform reconciliation operations in response to detecting a state change with respect to the assigned software component.

Operators can be deployed in a Kubernetes environment using an Operator Lifecycle Manager (OLM). OLM is a built-in component of Kubernetes that is designed to assist users in installing, updating, and managing the lifecycles of operators in the Kubernetes environment. OLM has a user interface through which users can select operators for deployment and manage updates. OLM can deploy the operators based on manifest files (e.g., YAML files) defining properties of the operators.

DETAILED DESCRIPTION

Some distributed computing environments include an operator management system for deploying, updating, and managing operators. For example, a distributed computing environment can include an Operator Lifecycle Manager (OLM) for installing, updating, and managing the lifecycles of operators in the distributed computing environment. Such operator management systems may include an operator catalog, which is a list of operators that the operator management system can deploy and manage in the distributed computing environment. A user may select among the operators listed in the operator catalog for causing the operator management system to configure and deploy the selected operator.

Not all operators may be listed by default in the operator catalog. In some cases, a user may wish to deploy a target operator in the distributed computing environment that is not included in the operator catalog by default. For example, the user may wish to download and install a new operator in the distributed computing environment. This can traditionally be a complicated, time consuming, and error-prone task. A user may have to issue numerous, complex commands to one or more application programming interfaces of the distributed computing environment to manually integrate the target operator with the operator management system, so that the target operator is included in the operator catalog, deployed in the distributed computing environment, and managed by the operator management system.

Some examples of the present disclosure can simplify the configuration and deployment process for a target operator by providing an operator configuration module that can perform numerous configuration and deployment steps in an automated fashion on behalf of the user, for example in response to a single command from the user, to significantly expedite and simplify the configuration and deployment process. For example, the operator configuration module can receive a command (e.g., a single command) from the user to deploy a target operator defined by a package. The package can be an image file or another grouping of files and directories having the required data for deploying the target operator in the distributed computing environment. In some examples, the package may be in a bundle format, which is a packaging format introduced by the Operator Framework and described in greater detail later on. In response to receiving the command, the operator configuration module can execute an automated installation process for integrating the target operator with an operator management system of the distributed computing environment and deploying the target operator in the distributed computing environment.

In some examples, the automated installation process can be a multi-step process that begins with the operator configuration module obtaining the package defining the target operator. For example, the operator configuration module can obtain the package from local memory or download the package from a package repository over the Internet. The operator configuration module can then extract information from the package. Examples of the extracted information can include a name, a namespace scope, and an update channel for the target operator.

In some examples, the automated installation process can involve generating an operator group for the target operator based on the information extracted from the package. An operator group can be a resource in a namespace, where the resource specifies a list of other namespaces (outside the namespace of the operator group) to be monitored by an operator assigned to the operator group. The operator configuration module can generate the operator group by transmitting one or more commands to one or more APIs of the distributed computing environment.

In some examples, the automated installation process can involve generating an index image for the target operator based on the extracted information. An index image can be an image file that can be deployed to serve an operator catalog for consumption by the operator management system. Generating the index image may involve generating the operator catalog in the index image, where the operator catalog includes the target operator. After generating the index image, the operator configuration module can deploy the index image in the distributed computing environment. Deploying the index image may allow for the operator management system to query a server to obtain the operator catalog defined in the index image. Based on obtaining the operator catalog defined in the index image, the operator management system can incorporate the target operator listed therein into an aggregated operator catalog of the operator management system.

In some examples, the automated installation process can involve subscribing the target operator to the operator management system using the information extracted from the package. One way of subscribing the target operator to the operator management system can involve generating a subscription object for the target operator. Because the operator management system may be configured to identify and monitor subscription objects in the distributed computing environment, the generation of a new subscription object for the target operator may automatically result in the target operator being subscribed to the operator management system (e.g., so that the target operator is managed by the operator management system).

To generate the subscription object, in some examples the operator configuration module can generate a subscription-object definition for the target operator based on the information extracted from the package. A subscription-object definition can be a data structure with various fields and values for use in generating a subscription object. Subscription-object definitions and subscription objects are described in greater detail later on. The operator configuration module may then use the subscription-object definition to deploy a subscription object for the target operator in the distributed computing environment. This may involve transmitting one or more commands to the APIs of the distributed computing environment.

Upon detecting the new subscription object for the target operator, in some examples the operator management system may automatically deploy the target operator in the distributed computing environment. For example, the operator management system may automatically generate one or more pods in the distributed computing environment and deploy the target operator in the one or more pods.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
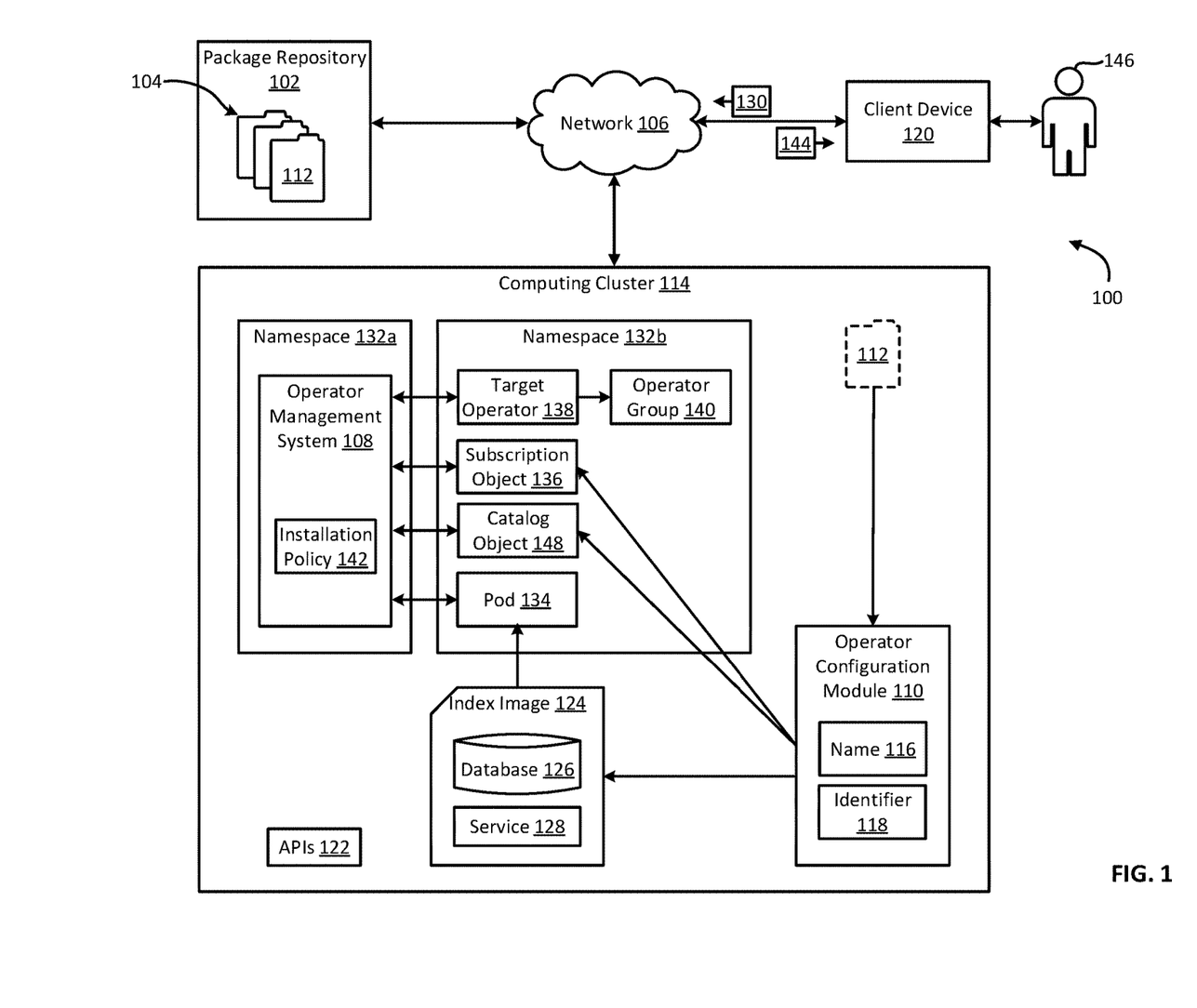
FIG. 1 shows a block diagram of an example of a system for automatically configuring and deploying software operators according to some aspects of the present disclosure.

FIG. 1 is a block diagram of an example of a system 100 for automatically configuring and deploying software operators according to some aspects of the present disclosure. The system 100 includes a computing cluster 114, but in other examples the system 100 may include another type of distributed computing environment. The computing cluster 114 can have any number and combination of physical nodes such as hardware servers or virtual nodes such as virtual machines to support various functionality, such as the functionality described herein. The computing cluster 114 may also include one or more application programming interfaces (APIs) 122 to assist with performing various tasks. In some examples, the APIs 122 can include the Kubernetes API.

The computing cluster 114 can include an operator management system 108, such as the Operator Lifecycle Manager. The operator management system 108 can be configured to assist users in installing, updating, and managing the lifecycles of operators in the computing cluster 114. The operator management system 108 can have a graphical user interface through which users can configure and deploy operators in the computing cluster 114. The graphical user interface can include an operator catalog, which can be a list of one or more operators capable of being deployed in the computing cluster 114.

Not all operators may be listed by default in the operator catalog. In some cases, a user 146 may wish to deploy a target operator 138 in the computing cluster 114 that is not included in the operator catalog by default. For example, the user 146 may wish to download and install a new operator in the computing cluster 114. To assist with this process, the computing cluster 114 can include an operator configuration module 110. The operator configuration module 110 can perform numerous configuration and deployment steps in an automated fashion on behalf of the user 146 to significantly expedite and simplify the configuration and deployment process.

More specifically, the user 146 can operate a client device 120 to issue a command 130 (e.g., a single command) for installing a target operator 138 in the computing cluster 114. Examples of the client device 120 can include a desktop computer, a laptop computer, a tablet, or a mobile telephone. The command 130 can specify a package 112 configured for deploying the target operator 138. The operator configuration module 110 can receive the command 130 from the client device 120 via a network 106, such as a local area network or the Internet. In response to receiving the command 130, the operator configuration module 110 can execute an automated installation process for integrating the target operator 138 with the operator management system 108 and/or deploying the target operator 138 in the computing cluster 114.

The operator configuration module 110 can begin the automated installation process by obtaining the package 112 specified in the command 130. In some examples, the operator configuration module 110 can obtain the package 112 from a package repository 102 via the network 106. The package repository 102 can have any number and combination of packages 104 corresponding to operators, where each package can be configured for deploying a different type of operator or a different version of an operator in a computing environment. The operator configuration module 110 may download the package 112 from the package repository 102 and store it locally for subsequent use.

Figure 2:
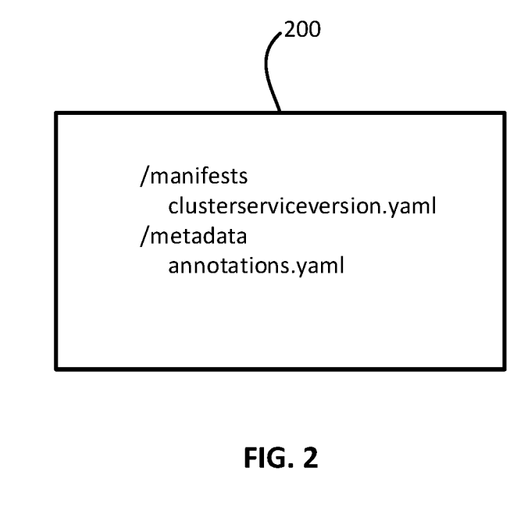
FIG. 2 shows an example of a package according to some aspects of the present disclosure.

In some examples, the package 112 may be in a bundle format, which is a packaging format introduced by the Operator Framework. A package 112 in the bundle format can be referred to herein as a bundle. A bundle represents a single version of an operator in a non-runnable container image. A bundle can include a manifest file and a metadata file. An example of the manifest file can include a ClusterServiceVersion (CSV) file. The manifest file can define role-based access control (RBAC) rules, dependencies, and other properties of the corresponding operator. An example of the metadata file can include an annotations file. The metadata file can identify the operator's name and version; indicate required and provided APIs; indicate related images and icons; indicate an update channel for the operator; or any combination of these. One example of a bundle 200 is shown in FIG. 2. As shown in FIG. 2, the bundle 200 includes a manifests directory and a metadata directory. The manifests directory includes a CSV file and the metadata directory includes an annotations file similar to those described above. Of course, in other examples the bundle 200 can include more, fewer, or different directories that have more, fewer, or different files than is shown in FIG. 2.

After obtaining the package 112, the operator configuration module 110 can extract a name 116 of the target operator 138 from the package 112. For example, the operator configuration module 110 can extract the name 116 from a metadata file in the package 112. The operator configuration module 110 may also extract an identifier 118 of an update channel for the target operator 138 from the package 112. For example, the operator configuration module 110 can extract the identifier 118 from the metadata file in the package 112. An update channel can be a pipeline through which updates for the target operator 138 may be received. There may be many possible update channels for a target operator 138. A selected update channel may be identified in the package 112 by name, internet protocol (IP) address, uniform resource locator (URL), or any other suitable means.

Once the name 116 and the identifier 118 have been extracted from the package 112, the next step of the automated installation process can involve incorporating the target operator 138 to an aggregated operator catalog. The aggregated operator catalog can be provided by the operator management system 108 to users. To incorporate the target operator 138 to the aggregated operator catalog, the operator configuration module 110 can begin by generating an index image 124 based on the package 112. An index image can be an image file that is deployable to serve an operator catalog for consumption by the operator management system 108. In particular, the index image 124 can define a database 126 and a service 128. The database 126 can include the operator catalog that lists one or more operators. The operator configuration module 110 can generate the database 126 to include the target operator 138 in the operator catalog. The service 128 can be configured to serve the operator catalog defined by the database 126 to a requestor, such as the operator management system 108. In some examples, the service 128 can include a remote procedure call (RPC) server configured to serve the operator catalog defined in the database 126.

After generating the index image 124, the operator configuration module 110 can deploy the index image 124 in the computing cluster 114. The operator configuration module 110 can deploy the index image 124 in a namespace 132b of the computing cluster 114. Deploying the index image 124 in the namespace 132b can involve deploying the database 126 and the service 128 in the namespace 132b. The particular namespace 132b to which the index image 124 is deployed may depend on a flag included in the command 130 from the user 146. By setting the appropriate flag in the command 130, the user 146 can control the namespace 132b in which the index image 124 is deployed. The operator configuration module 110 may deploy the database 126 and the service 128 in one or more containers of a container pod 134, which may help with management, scaling, and isolation of the database 126 and service 128.

Figure 3:
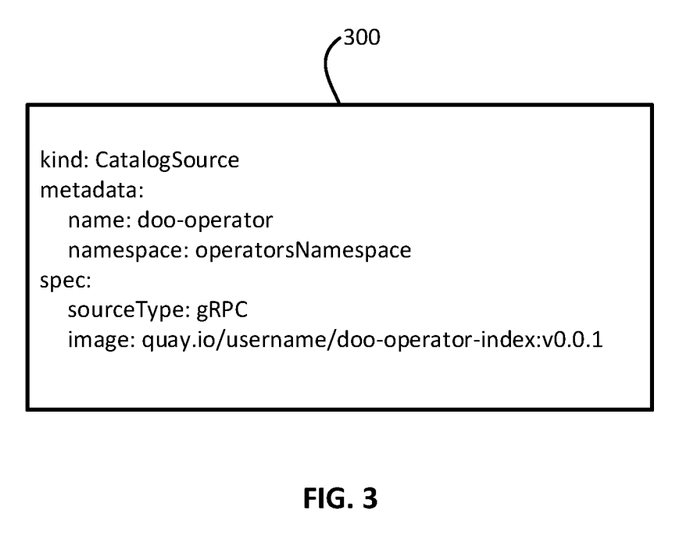
FIG. 3 shows an example of a catalog-object definition according to some aspects of the present disclosure.

In some examples, the operator configuration module 110 can deploy the index image 124 in the computing cluster 114 by generating a catalog object 148 corresponding to the index image 124. A catalog object can represent a deployment of a corresponding index image in the computing cluster 114. The catalog object 148 can be generated from a catalog-object definition that describes parameters for the catalog object 148. A catalog-object definition can be a data structure (e.g., a file) with fields and values for use in generating a catalog object. An example of a catalog-object definition 300 is shown in FIG. 3. In the example shown in FIG. 3, the catalog-object definition 300 has a kind of "CatalogSource," which is a type of kind provided in a Kubernetes-like environment. The catalog-object definition 300 also defines metadata, such as a name and namespace, associated with the catalog object 148. The catalog-object definition 300 further defines a type for the service 128 as "gRPC," which is a remote procedure call protocol developed by Google®. The catalog-object definition 300 additionally defines a location of the index image 124, such as an address to a repository at which the index image 124 is stored. Of course, other examples may include more, less, or different data in the catalog-object definition 300 than is shown in FIG. 3. The operator configuration module 110 can generate such a catalog-object definition 300 based on the name 116 and the location at which it stored the index image 124, among other things. The operator configuration module 110 can then transmit the catalog-object definition 300 to the API 122 for causing the computing cluster 114 to generate the catalog object 148.

The operator management system 108 can be configured to aggregate operator catalogs provided by index images to generate an aggregate operator catalog for delivery to users. The operator management system 108 can request operator catalogs from multiple services deployed from multiple index files to populate the aggregate operator catalog. By generating and deploying the index image 124 as described above, the operator configuration module 110 can allow for the operator management system 108 to request and integrate the operator catalog having the target operator 138 into its aggregate operator catalog. As a result, the operator catalog defined in the index image 124 may constitute a subset of the aggregate operator catalog that is ultimately provided to users by the operator management system 108.

The next step of the automated installation process can involve the operator configuration module 110 assigning the target operator 138 to an operator group 140. An operator group can be a resource in a namespace 132b, where the resource specifies a list of other namespaces (outside of namespace 132b) to be monitored by an operator associated with the operator group. Because an operator can be used to monitor software components in other namespaces, those namespaces may need to be assigned to the operator using an operator group 140 so that the operator has permission to monitor the software components in those other namespaces. To assign the target operator 138 to an operator group 140, the operator configuration module 110 may first check if the operator group 140 already exists in a target namespace 132b and, if not, generate the operator group 140 in the namespace 132b. If the operator group 140 already exists in the target namespace 132b, then the operator configuration module 110 may simply assign the target operator 138 to the existing operator group 140. The namespace 132b that is selected for the operator group 140 may depend on a flag included in the command 130 from the user 146. By setting the appropriate flag in the command 130, the user 146 can control the namespace 132b of the operator group 140.

The next step of the automated installation process can involve the operator configuration module 110 subscribing the target operator 138 to the operator management system 108, so that the target operator 138 can be managed by the operator management system 108. This may involve transmitting one or more communications to the APIs 122 for causing the computing cluster 114 to configure the subscription. In some examples, the target operator 138 can be subscribed to the operator management system 108 by generating a subscription object 136 for the target operator 138. The subscription object 136 can be a data object with information about the target operator 138. The operator configuration module 110 can generate the subscription object 136 based on the name 116 and the identifier 118 extracted from the package 112.

Figure 4:
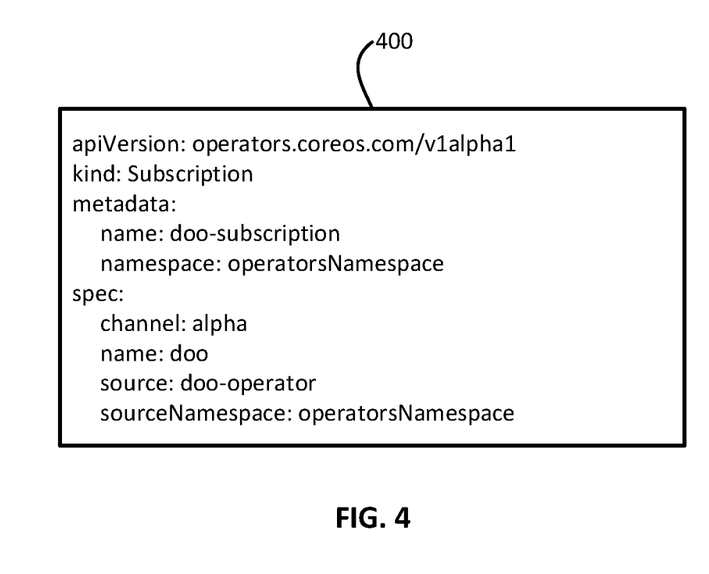
FIG. 4 shows an example of a subscription-object definition according to some aspects of the present disclosure.

In some examples, the operator configuration module 110 can generate the subscription object 136 by first creating a subscription-object definition. The subscription-object definition can be a data structure with various fields and values for use in generating the subscription object 136. An example of a subscription-object definition 400 is shown in FIG. 4. In the example shown in FIG. 4, the subscription-object definition 400 has a kind of "Subscription." The subscription-object definition 400 also defines metadata, such as a name and namespace, associated with the subscription object 136. The subscription-object definition 400 further defines an update channel, a name, a source, and a source namespace. Of course, in other examples the subscription-object definition 400 may include more, less, or different data than is shown in FIG. 4. The operator configuration module 110 can fill out the fields of the subscription-object definition 400 based on previously obtained information, such as the name 116 and the identifier 118 extracted from the package 112. The operator configuration module 110 may fill out the namespace and source-Namespace fields based on a flag of the command 130 provided by the user 146. After generating the subscription-object definition 400, the operator configuration module 110 can provide the subscription-object definition 400 to the APIs 122 for causing the computing cluster 114 to generate the subscription object 136.

The next step of the automated installation process can involve deploying the target operator 138 in the computing cluster 114. In some examples, the process of subscribing the target operator 138 to the operator management system 108 may automatically trigger deployment of the target operator 138 in the computing cluster 114 by the operator management system 108. In other examples, the user 146 may manually select the target operator 138 for deployment in the computing cluster 114 via the operator management system 108, which may now list the target operator 138 as available for deployment following the aforementioned steps. In response to detecting a manual selection of the target operator 138 by the user 146, the operator management system 108 can deploy the target operator 138 in the computing cluster 114. The namespace 132b to which the target operator 138 is deployed may depend on a flag included in the command 130 from the user 146. By setting the appropriate flag in the command 130, the user 146 can control the namespace 132b of the target operator 138.

In some examples, the operator configuration module 110 can automatically verify that the target operator 138 has been properly deployed. For example, the operator configuration module 110 can access a manifest file of the package 112, such as the CSV file described above. The manifest file can indicate a namespace scope for the target operator 138. The operator configuration module 110 can then transmit one or more communications to the APIs 122 for determining whether the instance of the target operator 138 is deployed in the computing cluster 114 with the namespace scope specified in the manifest file. The APIs 122 can respond to the communication by indicating to the operator configuration module 110 whether the instance of the target operator 138 is deployed in the computing cluster 114 and its namespace scope. If the instance of the target operator 138 is not deployed in the computing cluster 114, or it is deployed with the wrong namespace scope, it may indicate that the target operator 138 has not been properly deployed. So, the operator configuration module 110 can generate a notification 144 indicating that an error occurred with respect to deploying the target operator 138.

In some examples, the operator configuration module 110 can configure an installation policy 142 for the target operator 138 to prevent the operator management system 108 from deploying another version of the target operator that is different from the particular version of the target operator 138 defined in the package 112. For example, there may be many versions of the target operator 138 corresponding to different packages 104 in the package repository 102. The user 146 may have chosen a particular version of the target operator 138 for a specific reason (e.g., compatibility or security) and may not wish to have that version automatically updated by the operator management system 108 via the update channel identified in the package 112. To deactivate such automatic updates for the target operator 138, the operator configuration module 110 can change an update mode in the installation policy 142 from automatic to manual. Once in the manual update mode for the target operator 138, the operator configuration module 110 may periodically check the update channel for a new version of the target operator 138. If the operator configuration module 110 determines that a new version of the target operator 138 is available, the operator configuration module 110 can transmit an update request to the user 146 for manual confirmation. But in some examples, the operator configuration module 110 can automatically intercept and decline those update requests, to prevent the target operator 138 from being updated and minimize the workload on the user 146.

As one specific example of the process described above, the user 146 may issue the following command to the computing cluster 114 (e.g., to the operator configuration module 110) to deploy an operator called "doo-operator" in the computing cluster 114:

operator-sdk run bundle test.io/usemame/doo-operator-bundle:v0.0.1-namespace=ns1-install-mode=SingleNamespace Based on this command, the operator configuration module 110 can download the doo-operator-bundle package from the test.io location, extract the name "doo-operator" and an update-channel identifier from the package, generate a corresponding index image, and generate an operator group for doo-operator in the namespace "ns1" (e.g., namespace 132b). The operator configuration module 110 can also generate a catalog-object definition and a subscription-object definition for doo-operator. The operator configuration module 110 can then use the catalog-object definition to create a catalog object associated with the index image in the namespace "ns1," and use the subscription-object definition to create a subscription object associated with doo-operator in the namespace "ns1". Upon creating the subscription object, the operator management system 108 may automatically deploy doo-operator in namespace "ns1" of the computing cluster 114. The operator configuration module 110 can then verify the deployment, for example by confirming that an instance of doo-operator is running in the namespace "ns1" of the computing cluster 114.

In the doo-operator example described above, various components (e.g., the target operator 138, the operator group 140, the subscription object 136, and the catalog object 148) are deployed in the same namespace 132b as one another. But in other examples, some or all of these components may be deployed in different namespaces to one another. The namespace(s) to which these components are deployed can depend on the flags included in the command 130 (e.g., the "namespace" flag in the doo-operator example). If no flag is provided by the user 146 to dictate a namespace for these components, the operator configuration module 110 may generate some or all of these components by default in the same namespace 132a as the operator management system 108. Thus, some or all of these components may be deployed in the same namespace 132a as the operator management system 108 in some examples.

It will be appreciated that the above sequence of steps is provided for illustrative purposes and is intended to be non-limiting. Other examples may involve more steps, fewer steps, or a different sequence of the steps described above. In some examples, two or more of the steps may be implemented in parallel. Additionally, the specific number and arrangement of components shown in FIG. 1 is also intended to be illustrative and non-limiting. Other examples may include more components, fewer components, different components, or a different arrangement of the components described above. For instance, the operator configuration module 110 may be located externally to the computing cluster 114 in other examples. In some examples, two or more of the steps and components described above may be combined together. For instance, a single object that serves as both the catalog object and the subscription object may be generated from a single object definition.

Figure 5:
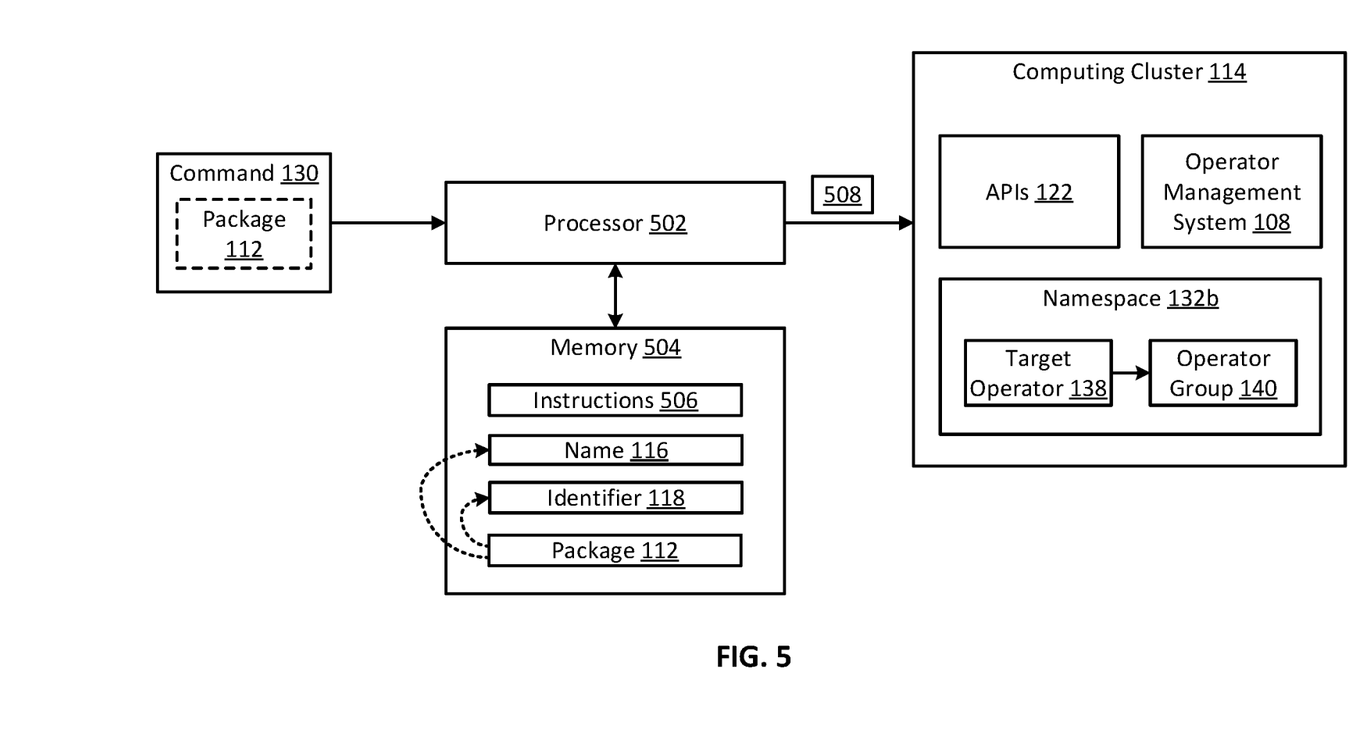
FIG. 5 shows a block diagram of another example of a system for automatically configuring and deploying software operators according to some aspects of the present disclosure.

FIG. 5 shows a block diagram of another example of a system 500 for automatically configuring and deploying software operators according to some aspects of the present disclosure. The system 500 includes a processor 502 communicatively coupled to a memory 504. In some examples, the processor 502 and the memory 504 can be part of the same computing device or can be distributed from (e.g., remote to) one another.

The processor 502 can include one processor or multiple processors. Non-limiting examples of the processor 502 include a Field-Programmable Gate Array (FPGA), an application-specific integrated circuit (ASIC), a microprocessor, etc. The processor 502 can execute instructions 506 stored in the memory 504 to perform operations. The instructions 506 may include processor-specific instructions generated by a compiler or an interpreter from code written in any suitable computer-programming language, such as C, C++, C#, etc. In some examples, the instructions 506 can correspond to the operator configuration module 110 of FIG. 1.

The memory 504 can include one memory or multiple memories. The memory 504 can be non-volatile and may include any type of memory that retains stored information when powered off. Non-limiting examples of the memory 504 include electrically erasable and programmable read-only memory (EEPROM), flash memory, or any other type of non-volatile memory. At least some of the memory 504 can include a non-transitory computer-readable medium from which the processor 502 can read instructions 506. A computer-readable medium can include electronic, optical, magnetic, or other storage devices capable of providing the processor 502 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 506.

The processor 502 can execute the instructions 506 to perform operations. For example, the processor 502 can receive a command 130 specifying a package 112 for deploying a target operator 138 (e.g., a particular version of the target operator 138). In response to receiving the command 130, the processor 502 can automatically configure and deploy the target operator 138 in a computing cluster 114. For example, the processor 502 can extract, from the package 112, a name 116 for the target operator 138 and an identifier 118 of an update channel for the target operator 138. The processor 502 can assign an operator group 140 in a namespace 132b to the target operator 138. The processor 502 can subscribe the target operator 138 to an operator management system 108 by indicating the name 116, the identifier 118, and the namespace 132b to one or more application programming interfaces (APIs) 122 of the computing cluster 114. The processor 502 can also deploy an instance of the target operator 138 in the namespace 132b on the computing cluster 114.

Figure 6:
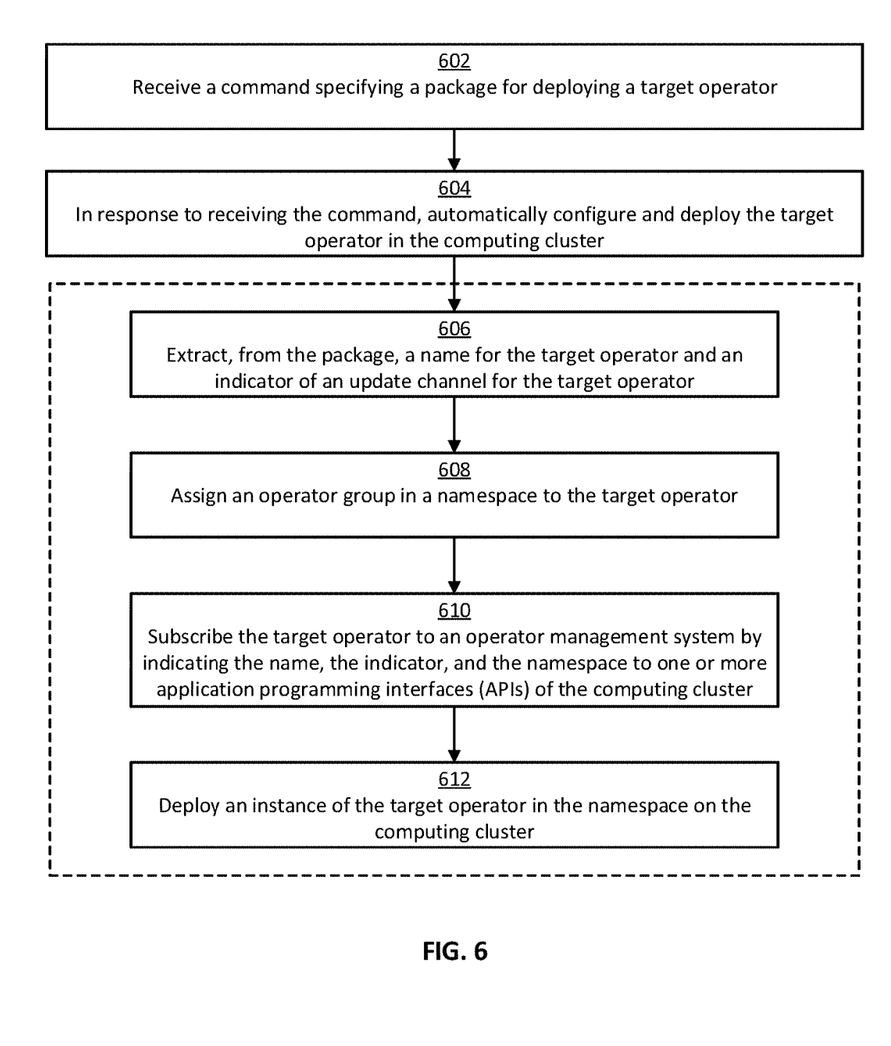
FIG. 6 shows flow chart of an example of a process for automatically configuring and deploying software operators according to some aspects of the present disclosure.

FIG. 6 shows flow chart of an example of a process for automatically configuring and deploying software operators according to some aspects of the present disclosure. Other examples can include more steps, fewer steps, different steps, or a different order of the steps than is shown in FIG. 6. The steps of FIG. 6 are discussed below with reference to the components discussed above in relation to FIG. 5.

In block 602, a processor 502 receives a command 130 specifying a package 112 for deploying a target operator 138. The command 130 can be received from a client device of a user. In some examples, the command 130 may also include one or more flags, for example designating a namespace and an install mode for the target operator 138.

In block 604, the processor 502 automatically configures and deploys the target operator 138 in a computing cluster 114, in response to receiving the command 130. This may involve the processor 502 performing the steps shown in the dashed box of FIG. 6 and described below.

In block 606, the processor 502 extracts a name 116 for the target operator 138 from the package 112. The processor 502 also extract an identifier 118 of an update channel for the target operator 138 from the package 112.

In block 608, the processor 502 assigns an operator group 140 in a namespace 132b to the target operator 138. In some examples, the processor 502 may first check whether the operator group 140 already exists in the namespace 132b. If not, the processor 502 can generate the operator group 140, for example by communicating with one or more application programming interfaces (APIs) 122 of the computing cluster 114.

In block 610, the processor 502 subscribes the target operator 138 to an operator management system 108 by indicating the name 116, the identifier 118, and the namespace 132b to one or more application programming interfaces (APIs) 122 of the computing cluster 114. For example, the processor 502 can generate a subscription-object definition that specifies the name 116, the identifier 118, and the namespace 132b. The processor 502 can then provide the subscription-object definition to the APIs 122 for causing the computing cluster 114 to generate a corresponding subscription object. Generating the subscription object in the computing cluster 114 may automatically subscribe the target operator 138 to the operator management system 108. For example, the operator management system 108 may be configured to automatically identify some or all of the subscription objects in the computing cluster 114 and ingest their information to manage their corresponding operators.

In block 612, the processor 502 deploys an instance of the target operator 138 in the namespace 132b on the computing cluster 114. The processor 502 may deploy the instance of the target operator 138 using the package 112. For example, the processor 502 can deploy the instance of the target operator 138 by providing a manifest file from the package 112 to the APIs 122 of the computing cluster 114. In some examples, the processor 502 can automatically deploy the instance in response to the target operator 138 being subscribed to the operator management system 108.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
receive a command specifying a package for deploying a target operator;
in response to receiving the command, automatically configure and deploy the target operator in a computing cluster by:
extracting, from the package, a name for the target operator and an update channel identifier, wherein the update channel identifier is an identifier of a channel through which updates to the target operator can be received;
assigning an operator group in a namespace to the target operator;
subscribing the target operator to an operator management system by indicating the name, the update channel identifier, and the namespace to one or more alpplication programming interfaces (APIs) of the computing cluster, wherein subscribing the target operator to the operator management system involves:
generating a subscription-object definition associated with the target operator; and providing the subscription-object definition to the one or more APIs to generate a subscription object for the target operator, wherein the operator management system is configured to manage operators described in subscription objects, and wherein the subscription object associated with the target operator is configured for use by the operator management system; and
deploying an instance of the target operator in the namespace on the computing cluster.

2. The system of claim 1, wherein the command is a single command from a user that specifies the package defining the target operator, and wherein the memory further includes instructions that are executable by the processor for causing the processor to download the package from a remote registry over a network to the computing cluster.

3. The system of claim 1, wherein the package includes a metadata directory containing a metadata file, wherein the metadata file specifies the name for the package and the update channel identifier.

4. The system of claim 1, wherein the computing cluster includes a Kubernetes environment, the operator management system is an Operator Lifecycle Manager, and the package is a bundle.

5. The system of claim 1, wherein the memory further includes instructions that are executable by the processor for causing the processor to:
generate an index image based on the package, the index image being configured for deploying a database that defines an operator catalog listing one or more operators including the target operator that are available for deployment in the computing cluster, and the index image being configured for deploying a service for serving the operator catalog to client devices; and
deploy the index image in the computing cluster, wherein deploying the index image involves deploying the database and the service in a container pod of the computing cluster.

6. The system of claim 1, wherein the memory further includes instructions that are executable by the processor for causing the processor to:
determine whether the operator group exists in the namespace; and
based on determining that the operator group does not exist in the namespace, generate the operator group in the namespace and assign the operator group to the target operator; or
based on determining that the operator group does exist in the namespace, assign the operator group to the target operator.

7. The system of claim 1, wherein the memory further includes instructions that are executable by the processor for causing the processor to verify a deployment of the target operator in the computing cluster subsequent to subscribing the target operator to the operator management system.

8. The system of claim 7, wherein verifying the deployment of the target operator in the computing cluster involves:
retrieving a manifest file from the package, the manifest file describing a namespace scope for the target operator;
transmitting a communication to an API of the computing cluster for determining whether the instance of the target operator is deployed in the computing cluster with the namespace scope defined in the manifest file; and
in response to determining that the instance of the target operator is not deployed in the computing cluster or that the instance does not have the namespace scope defined in the manifest file, generating a notification indicating that an error occurred with respect to deploying the target operator.

9. The system of claim 1, wherein the package defines a particular version of the target operator, and wherein the memory further includes instructions executable by the processor for causing the processor to:

configure an installation policy for the target operator to prevent the operator management system from deploying another version of the target operator that is different from the particular version of the target operator defined in the package.

10. A method comprising:

receiving, by a processor, a command specifying a package for deploying a target operator;

in response to receiving the command, automatically configuring and deploying, by the processor, the target operator in a computing cluster by:

extracting, from the package, a name for the target operator and an update channel identifier, wherein the update channel identifier is an identifier of a channel through which updates to the target operator can be received;

assigning an operator group in a namespace to the target operator;

subscribing the target operator to an operator management system by indicating the name, the update channel identifier, and the namespace to one or more application programming interfaces (APIs) of the computing cluster, wherein subscribing the target operator to the operator management system involves:

generating a subscription-object definition associated with the target operator; and providing the subscription-object definition to the one or more APIs to generate a subscription object for the target operator, wherein the operator management system is configured to manage operators described in subscription objects, and wherein the subscription object associated with the target operator is configured for use by the operator management system; and deploying an instance of the target operator in the namespace on the computing cluster.

11. The method of claim 10, wherein the command is a single command from a user that specifies the package defining the target operator, and further comprising downloading the package from a remote registry over a network to the computing cluster.

12. The method of claim 10, wherein the package includes a metadata directory containing a metadata file, and wherein the metadata file specifies the name for the package and the update channel identifier.

13. The method of claim 10, wherein the computing cluster includes a Kubernetes environment, the operator management system is an Operator Lifecycle Manager, and the package is a bundle.

14. The method of claim 10, further comprising:

generating an index image based on the package, the index image being configured for deploying a database that defines an operator catalog listing the target operator, and the index image being configured for deploying a service for serving the operator catalog to client devices; and deploying the index image in the computing cluster, wherein deploying the index image involves deploying the database and the service in a container pod of the computing cluster.

15. The method of claim 10, further comprising verifying a deployment of the target operator in the computing cluster by:

retrieving a manifest file from the package, the manifest file describing a namespace scope for the target operator;

transmitting a communication to an API of the computing cluster for determining whether the instance of the target operator is deployed in the computing cluster with the namespace scope defined in the manifest file; and in response to determining that the instance of the target operator is not deployed in the computing cluster or that the instance does not have the namespace scope defined in the manifest file, generating a notification indicating that an error occurred with respect to deploying the target operator.

16. The method of claim 10, wherein the package defines a particular version of the target operator, and further comprising configuring an installation policy for the target operator to prevent the operator management system from deploying another version of the target operator that is different from the particular version of the target operator defined in the package.

17. A non-transitory computer-readable medium comprising program code that is executable by a processor for causing the processor to:

receive a command specifying a package for deploying a target operator;

in response to receiving the command, automatically configure and deploy the target operator in a computing cluster by:

extracting, from the package, a name for the target operator and an update channel identifier, wherein the update channel identifier is an identifier of a channel through which updates to the target operator can be received;

assigning an operator group in a namespace to the target operator;

subscribing the target operator to an operator management system by indicating the name, the update channel identifier, and the namespace to one or more application programming interfaces (APIs) of the computing cluster, wherein subscribing the target operator to the operator management system involves:

generating a subscription-object definition associated with the target operator; and providing the subscription-object definition to the one or more APIs to generate a subscription object for the target operator, wherein the operator management system is configured to manage operators described in subscription objects, and wherein the subscription object associated with the target operator is configured for use by the operator management system; and deploying an instance of the target operator in the namespace on the computing cluster.

18. The non-transitory computer-readable medium of claim 17, wherein the update channel identifier includes a name, an internet protocol (IP) address, or a uniform resource locator (URL) corresponding to the channel.

* * * * *